2,872,309

MANGANESE-NICKEL BASE BRAZING ALLOYS

Wilbur T. Bolkcom, Allison Park, and William E. Knapp, Pittsburgh, Pa.

No Drawing. Application July 24, 1956
Serial No. 599,702

6 Claims. (Cl. 75—134)

This invention relates to alloys and particularly to an alloy having surprising properties as a brazing alloy, as a brazed joint and as an addition alloy suitable for use in the manufacture of metals such as iron, steel, aluminum, etc. This application is a continuation-in-part of our earlier filed application Ser. No. 302,416, filed August 2, 1952, now abandoned.

The use of brazing as a method of forming joints between two or more members or repairing breaks in a metallic member has long been known. Brazing has, however, not met with favor in many instances and has not been used in situations where it would be advantageous because of the problems of atmospheric corrosion and fluxing which have characterized the brazing materials and the brazed joints formed from the conventional material heretofore available. This is particularly true in the higher temperature applications of brazing. Some of the problems which have been faced by conventional brazing practices and which have not been entirely satisfactorily solved are the problems of high temperature strength, resistance to oxidation and atmospheric corrosion, ability to wet the surface to be jointed by the brazing metal and fluxing the joint and protecting the joint while the brazing is being done.

In the manufacture of iron and steel as well as the manufacture of other metals, it is frequently desirable to add rare earth metals for their beneficial effects, among which are their effect on sulphur reduction, increased toughness, their effect on the nitrogen contained in the metal, etc. It has been the usual practice heretofore to add the rare earth metals either in the form of purified metal or as metal salts. In both of these forms the rare earths have a very low density and tend to float on the surface of the metal to which they are added. They also tend to be lost by vaporization and by deterioration in storage.

We have discovered an alloy having surprising properties as a brazing alloy, as a complete braze deposit and as an addition alloy for the manufacture of metal alloys for incorporating rare earth metals into other alloy compositions. The alloy of our invention solves most if not all of the problems outlined above which have plagued brazing processes heretofore used. The alloy of this invention provides high temperature strength to brazed joints as well as great resistance to atmospheric corrosion and oxidation. The alloy of this invention has the peculiar ability to wet metals being joined to a very high degree and in many cases to act as its own flux without the need for other independent fluxing or reducing materials. As a result, it is possible to eliminate the need for reducing atmospheres about the braze joint during the brazing process. The alloy of this invention is particularly suitable for brazing material such as stainless steel and the high temperature high chromium nickel allows. Such joints have high tensile strengths at both room and elevated temperatures, resistance to oxidation at elevated temperatures and other highly desirable properties heretofore unobtainable by conventional brazing practices.

The alloy of this invention also has surprising effectiveness as an addition alloy by means of which rare earth metals can be incorporated as alloying constituents into other molten metals without the disadvantages common to the forms of rare earth heretofore used. The addition alloy of the present invention has a high density and tends to sink into the body of the molten metal to which it is added. It has a lower melting point than the usual rare earth salts and purified metals and is more economical to produce. The alloy of this invention is stable with respect to deterioration in storage and it is substantially free from loss by vaporization when added to molten metals. Additionally, the matrix materials used in the present alloy are ordinarily used as alloying materials in a variety of commercial metals and accordingly cause no deleterious results in most materials to which the alloy is added.

In general, the alloy of the present invention may have the following broad composition:

About 10% to 95% manganese
About 0% to 75% nickel
About 5% to 60% rare earth metals Preferably, however, a narrower range of composition is used. This range is as follows:

About 25% to 60% manganese
About 5% to 65% nickel
About 10% to 30% rare earth metals The preferred composition is:

45% manganese
30% nickel
25% rare earth metals

To the above basic alloy we may add up to about 18% zirconium, hafnium and titanium, based on the total weight of the alloy. The addition of zirconium, hafnium or titanium alone or in combination is desirable in many cases. These metals appear to have some highly desirable protective effect on the rare earth metals, particularly during the brazing operation.

When speaking of the rare earth metals in this application we mean those metals which fall within the group beginning with lanthanum, atomic No. 57 and extending through lutecium, atomic No. 71. The most commonly used members of the group are lanthanum, cerium, praseodymium and neodymium. The alloy of this invention may contain small amounts of impurities such as iron, copper, carbon, etc., which accompany the raw materials from which the alloy is made. These impurities, in ordinary amounts, do not deleteriously affect the alloy and are accordingly not objectionable.

When used as an addition alloy the alloy of this invention increases tremendously the residual rare earth which may be expected in the alloy produced from it. For example, a 310 stainless steel when made with the addition of 4 lb. per ton of ordinary rare earth metals of commerce (99% pure) will produce a residual of only about .008% to .05% in the steel, averaging approximately a 10% recovery. In the same steel an addition of 4 lb. per ton of the alloy according to this invention containing 45% manganese, 30% nickel, 25% rare earths, and small amounts of impurities will result in a residual of about .02% to .03% rare earths in the steel, approximately a 50% recovery of the rare earth metals. It is accordingly clear that substantial economics in recovery may be expected by the use of the alloy of this invention in the manufacture of iron and steel. This increase in efficiency is probably a result of several factors including the high density of our alloy and the fact that the matrix materials tend to hold the materials in solution thus retarding the loss by vaporization which is common with the presently used forms of rare earth metals.

When used as a brazing alloy the alloy of this invention appears to have self-fluxing properties and has been used for making brazed joints without the use of any fluxing material for joining stainless steel members. In such applications the alloy containing zirconium, hafnium or titanium alone or in combination appears to be highly effective. For example, brazed joints made on stainless steel with an alloy composed of 45% manganese, 30% nickel, 20% misch metal and 5% zirconium having a melting point of about 1800° F. are highly resistant to corrosion at the joint and may be made without flux or protective atmospheres. The joints are highly satisfactory and show high tensile strengths and resistance to oxidation.

While we have described a particular embodiment of our invention, it will be understood that it may be otherwise embodied within the scope of the following claims.

We claim:

1. A brazing alloy comprising about 25% to 60% manganese, about 5% to 65% nickel, about 10% to 30% rare earth metals and an effective amount to promote fluxing up to about 18% of one of the group zirconium, hafnium and titanium, the balance being usual impurities in ordinary amounts.

2. A brazing alloy comprising about 45% manganese, 30% nickel, about 20% rare earth metals and about 5% of one of the group consisting of zirconium, hafnium and titanium, the balance being usual impurities in ordinary amounts.

3. A brazing alloy comprising 45% manganese, 30% nickel, 20% rare earth metals and 5% zirconium.

4. A brazed deposit between two or more metallic members comprising the solidified product of the fused alloy consisting of about 25% to 60% manganese, about 5% to 65% nickel, about 10% to 30% rare earth metals and up to about 18% of one of the group zirconium, hafnium and titanium, the balance being usual impurities in ordinary amounts together with the fused adjacent surfaces of the metallic members.

5. A brazed deposit between two or more metallic members comprising the solidified product of the fused alloy consisting of about 45% manganese, 30% nickel, about 20% rare earth metals and about 5% of one of the group consisting of zirconium, hafnium and titanium, the balance being usual impurities in ordinary amounts together with the fused adjacent surfaces of the metallic members.

6. A brazed deposit between two or more metallic members comprising the solidified product of the fused alloy consisting of about 45% manganese, 30% nickel, 20% rare earth metals and 5% zirconium together with the fused adjacent surfaces of the metallic members.

References Cited in the file of this patent

UNITED STATES PATENTS 2,642,358   Kent   June 16, 1953

FOREIGN PATENTS 579,643   Great Britain   Aug. 12, 1946

UNITED STATES PATENT OFFICE
CERTIFICATE OF CORRECTION

Patent No. 2,872,309                                                      February 3, 1959

Wilbur T. Bolkcom, et al.

It is hereby certified that error appears in the printed specification of the above numbered patent requiring correction and that the said Letters Patent should read as corrected below.

Column 1, line 70, for "allows" read -- alloys --.

Signed and sealed this 26th day of May 1959.

(SEAL)
Attest:

KARL H. AXLINE                                                     ROBERT C. WATSON
Attesting Officer                                            Commissioner of Patents